RUTH RUSSELL.

Culinary Boiler.

No. 122,407. Patented Jan. 2, 1872.

UNITED STATES PATENT OFFICE.

RUTH RUSSELL, OF NEW BEDFORD, MASSACHUSETTS.

IMPROVEMENT IN CULINARY-BOILERS.

Specification forming part of Letters Patent No. 122,407, dated January 2, 1872.

*To all persons to whom these presents may come:*

Be it known that I, RUTH RUSSELL, of New Bedford, of the county of Bristol and State of Massachusetts, have invented a new and useful or Improved Apparatus for Boiling or Steaming Rice or various other edible matters; and do hereby declare the same to be fully described in the following specification and represented in the accompanying drawing, of which—

Figure 1:
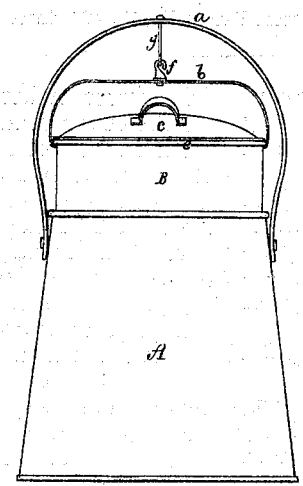
Figure 2:
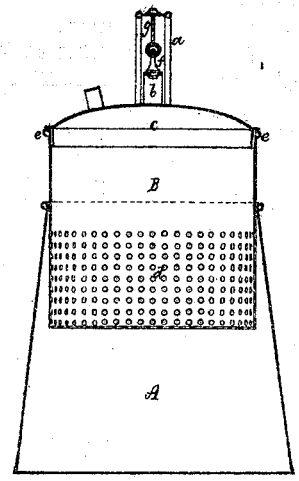

Figure 1 is a front elevation, and Fig. 2 a vertical section of it.

It is specially useful for cooking rice, corn, potatoes, or small vegetables or fruits, which, after having been boiled within the foraminous holding-vessel at its lowest position within the water-vessel, are, with the foraminous vessel, to be raised up, and the latter is to be suspended from the bale of the water-vessel in order that the surplus water may be drawn from the material boiled into the water-vessel or be steamed by vapor therefrom, all of which will be understood from the nature of the apparatus.

In the drawing, A denotes a kettle or boiler provided with a high arched bale, $a$, as represented, the said vessel being open at top. Within the vessel or kettle A is another cylindrical vessel or kettle, B, provided with a bale, $b$, and a cover, $c$, and perforated or made foraminous in its bottom or in such and a portion of its side, as shown at $d$. The vessel B has a diameter equal to or a trifle less than that of the mouth of the vessel A, and at its upper part is furnished with a flange, $e$, to rest on the top of such vessel A. Furthermore, the bale of the vessel B is provided with a hook, $f$, to project upward from its middle, as shown, and to take into a swivel, $g$, applied to the bale of the vessel A in such manner as to be capable of being easily engaged with or disengaged from the hook as occasion may require. The outer kettle A is to hold water, the inner kettle B being to contain the rice or material to be cooked, steamed, or boiled.

I claim—

The apparatus, substantially as described, as composed of the kettle or boiling-vessel A, the foraminous kettle or material-holder B, the two bales $a$ $b$, and the hook $f$ and swivel $g$, all being arranged and to operate essentially as explained and shown.

RUTH RUSSELL.

Witnesses:
CHARLES W. CLIFFORD,
WALTER CLIFFORD. (154)